(12) United States Patent
Blénessy et al.

(10) Patent No.: US 8,140,056 B2
(45) Date of Patent: Mar. 20, 2012

(54) METHOD AND APPARATUS FOR NOTIFYING USER OF CONTENT CHANGE OF A PAGE OUTSIDE A DISPLAYED PORTION

(75) Inventors: Peter Blénessy, Eslöve (SE); Henrik Baard, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 496 days.

(21) Appl. No.: 12/228,215

(22) Filed: Aug. 11, 2008

(65) Prior Publication Data
US 2010/0035657 A1    Feb. 11, 2010

(51) Int. Cl.
*H04M 1/725* (2006.01)

(52) U.S. Cl. .......... 455/412.2; 455/412.1; 455/566; 455/418; 455/414.1; 709/201; 709/203; 709/225

(58) Field of Classification Search .......... 455/566, 455/412.2, 414.1, 418; 709/203; 715/801
See application file for complete search history.

(56) References Cited

U.S. PATENT DOCUMENTS

| | | | | |
|---|---|---|---|---|
| 5,745,689 A | * | 4/1998 | Yeager et al. | 709/206 |
| 5,790,789 A | * | 8/1998 | Suarez | 709/202 |
| 5,790,790 A | * | 8/1998 | Smith et al. | 709/206 |
| 5,892,909 A | * | 4/1999 | Grasso et al. | 709/201 |
| 6,138,158 A | * | 10/2000 | Boyle et al. | 709/225 |
| 6,738,804 B1 | * | 5/2004 | Lo | 709/219 |
| 8,060,492 B2 | * | 11/2011 | Nair et al. | 707/709 |
| 2005/0044506 A1 | | 2/2005 | Makela | |
| 2007/0263007 A1 | | 11/2007 | Robotham et al. | |
| 2008/0077653 A1 | * | 3/2008 | Morris | 709/203 |

OTHER PUBLICATIONS

Schneider, Haim, "Dynamic Portal Content Update Using Publish/Subscribe," Proceedings of the IASTED International Conference Web Technologies, Applications, and Services, Jul. 4-6, 2005, Calgary, Alberta, Canada, pp. 154-158.
PCT/EP2009/000954, International Search Report and Written Opinion, mailed on Apr. 24, 2009.

* cited by examiner

*Primary Examiner* — Nick Corsaro
*Assistant Examiner* — Babar Sarwar
(74) *Attorney, Agent, or Firm* — Peter F. Corless; Steven M. Jensen; Edwards Wildman Palmer LLP

(57) ABSTRACT

Embodiments of mobile electronic devices and methods are disclosed. In an embodiment of a method, a page is partially displayed on a display, and information is received that the page is changed in a part of said page not displayed on said display. In an embodiment, a user is notified of said change.

15 Claims, 4 Drawing Sheets

This is an example for a part of a webpage.

Please choose:

☐ Full list
☐ Short list

This is an example for a part of Update here a webpage.

Please choose:

☐ Full list
☐ Short list
You are here

METHOD AND APPARATUS FOR NOTIFYING USER OF CONTENT CHANGE OF A PAGE OUTSIDE A DISPLAYED PORTION

FIELD OF THE INVENTION

The present application relates to mobile electronic devices and methods usable for example for operating mobile electronic devices.

BACKGROUND

Mobile electronic devices are a commodity commonly used in daily life. Examples for such mobile electronic devices are mobile phones or personal digital assistants (PDAs), but also for example laptop computers. Such mobile electronic devices are increasingly used for accessing the internet, for example for surfing in the World Wide Web (WWW), and viewing webpages thereof.

Usually, webpages are designed to be viewed using computers having comparatively large displays, for example 15 inch displays, 17 inch displays or 21 inch displays, the number of inches being a measure of the diagonal of the display, with a correspondingly high resolution, e.g. 1024×768 pixels, 800×600 pixels or 1280×1024 pixels, to give some examples for resolutions commonly used. However, many mobile electronic devices, for example the aforementioned mobile phones or personal digital assistants, have considerably smaller displays with lower resolution, so that usually only a small part of a complete webpage can be displayed.

Webpages increasingly comprise so-called dynamic content, in particular with the increased use of asynchronous Java scripting and XML (sometimes referred to as AJAX). Such webpages change their content dynamically, for example in response to user input, or also periodically in given time intervals. Since such changes often relate to only a portion of the whole webpage, when due to a small display only a comparatively small portion of the webpage is displayed, it may happen that the change relates only to a part of the webpage not currently displayed. Therefore, a user may not be aware of such a change of content or update of a part of the webpage and possibly may miss important information.

SUMMARY OF THE INVENTION

In an embodiment, a mobile electronic device is provided, comprising: a display and a display control circuit configured to display a part of a page on said display. Said display control circuit is configured to register a change of said page in a part of said page not being displayed on said display and to notify a user of the mobile electronic device of said change.

In an embodiment, said display control circuit comprises: a processor, and
a memory, said memory comprising at least one program executable by said processor, said at least one program when executed causing said displaying, said registering and said notifying.

Said page may comprise a webpage with dynamically changing content, and
said at least one program may comprise a browser program.

The mobile electronic device may further comprise a user input circuitry. In such an embodiment, said registering may comprise registering a user action via said user input circuitry and determining that said user action results in said change of a part of said page.

In an embodiment, said notifying may comprise displaying information on said display indicative of said change.

Said information may comprise at least part of said changed part of said page.

Additionally or alternatively, said information may also comprise information displayed in a transparent manner overlying a currently displayed part of said page.

In an embodiment, said notifying comprises at least one element of the group comprising reproducing an audio signal, displaying an animation on said display and displaying an overview of said page on said display.

Said display control circuit may be further configured to receive an indication from a user indicative of whether the user requires to see the changed part of the page, and to display said changed part of the page in case the indication received from the user indicates that the user requires to see said changed part.

Said mobile electronic device may be selected from the group comprising a mobile phone, a personal digital assistant, a gaming equipment, a navigation system and a notebook, but is not limited thereto.

In another embodiment, a method is provided, comprising:
partially displaying a page on a display,
receiving information that said page is changed in a part of said page not displayed on said display, and
notifying a user of said change.

Said notifying may comprise displaying one element selected from the group comprising a part where said page is changed and an overview of said page highlighting said change on said display.

Said displaying of said one element may be performed in a transparent manner.

In an embodiment, said method comprises receiving a user input causing said change.

The method may comprise receiving said page from a network.

It is to be understood that the above features may be freely combined with each other as desired by a person skilled in the art unless specifically noted to the contrary.

BRIEF DESCRIPTION OF THE DRAWINGS

FIG. 3A is an example for a display of a part of a webpage according to an embodiment.

FIG. 3B is an example of an update notification on the display of FIG. 3A according to an embodiment of the present invention.

DETAILED DESCRIPTION OF THE INVENTION

Figure 1:
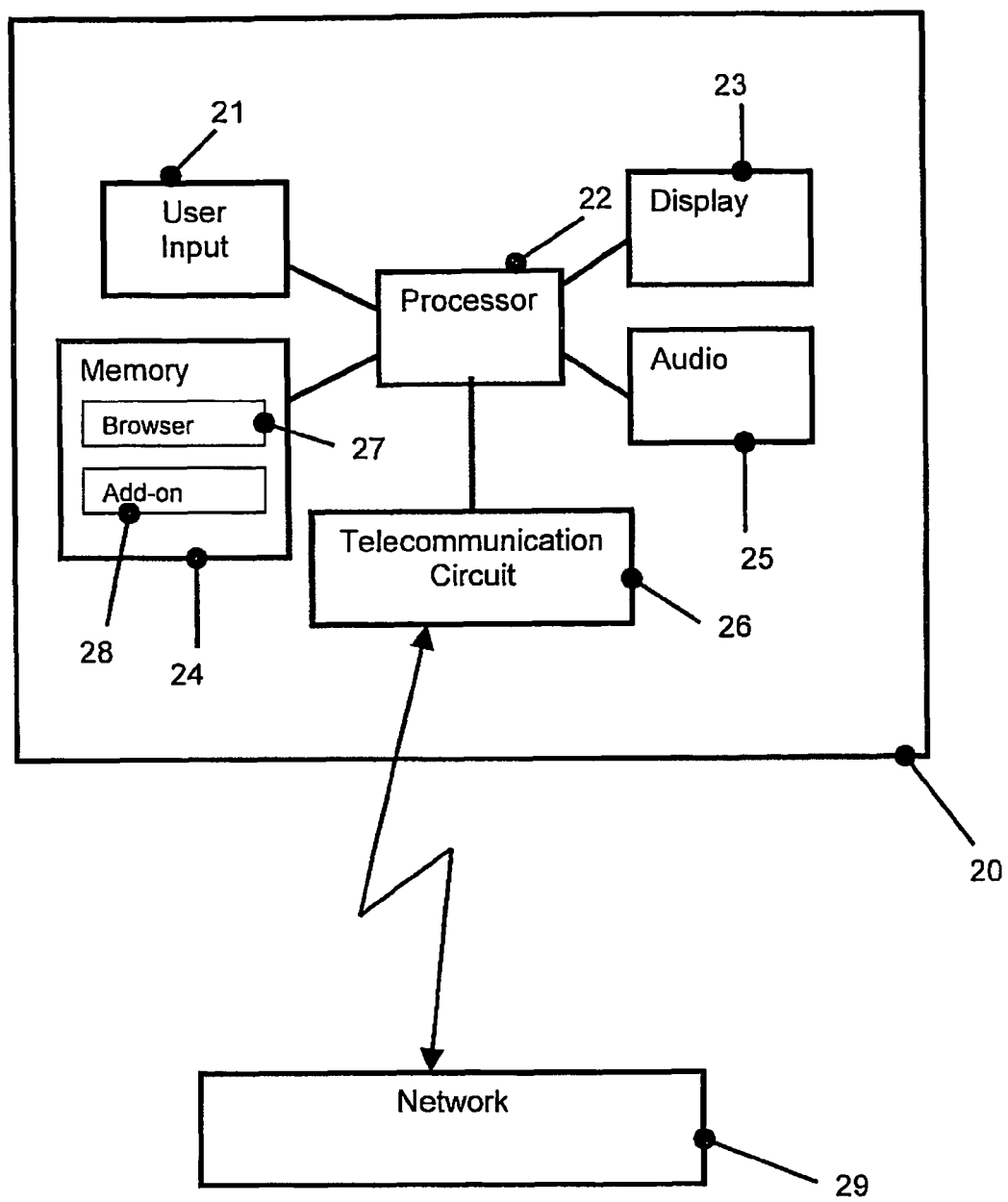
FIG. 1 is a schematic diagram showing a mobile device according to an embodiment of the present invention.

In the following, embodiments of the present invention will be described in detail. It is to be understood that the following description of embodiments is given only for the purpose of illustration and is not be taken in a limiting sense. The scope of the invention is not intended to be limited by the embodiments described hereinafter or by the drawings, which are taken to be illustrative only, but is intended to be limited only by the appended claims and equivalents thereof.

It should be noted that the drawings are to be regarded as being schematic representations only, and elements in the drawings are not necessarily to scale with each other. Rather, the representation of the various elements is chosen such that their function and general purpose become apparent to a person skilled in the art.

It is also be understood that in the following description of embodiments, any direct connection or coupling between functional blocks, devices, components, circuit elements or other physical or functional units shown in the drawings or described herein, i.e. any connection or coupling without intervening elements, could also be implemented by an indirect connection or coupling, i.e. a connection or coupling with one or more additional intervening elements. Furthermore, it should be appreciated that the partitioning of embodiments into functional blocks or units shown in the drawings is not to be construed as indicating that these units necessarily are implemented as physically separate units, but functional blocks or units may be implemented as separate circuits, chips or circuit elements, but one or more functional blocks or units may as well be implemented in a common circuit or chip.

It is to be understood that the features of the various embodiments described hereinafter may be combined with each other unless specifically noted otherwise.

Furthermore, it is to be understood that describing an embodiment comprising a plurality of elements or features is not to be construed as indicating that all these elements or features are necessary for practicing the present invention. Instead, in other embodiments, only some of such elements or features may be implemented, and/or alternative or additional elements or features may be provided.

Turning now to FIG. 1, a mobile electronic device 20 according to an embodiment of the present invention is shown. Mobile electronic device 20 of FIG. 1 may be a mobile phone, but may also be another kind of portable electronic device like a personal digital assistant, a laptop computer, a gaming device, a portable music player, a navigation system or a combination thereof. It should be noted that in FIG. 1 only some components of mobile electronic device 20 are shown, and the mobile electronic device may or may not comprise further components depending on the type of mobile electronic device. For example, in case the mobile electronic device is a mobile phone, components conventionally found in mobile phones like an antenna, a microphone, a SIM card or interface therefore or other electronic components may be present although not explicitly shown in FIG. 1.

Mobile electronic device 20 of the embodiment of FIG. 1 comprises a user input 21, which for example may comprise a keypad, one or more buttons, a joystick, and/or any other input means commonly found in mobile electronic devices. Information input by a user via user input 21 is processed by a processor 22. Furthermore, mobile electronic device 20 comprises a display 23 controlled by processor 22 for displaying information and an audio unit 25 for outputting audio messages, sound, or music. It should be noted that display 23 may be a so-called touch screen display and therefore also serve as or as part of user input 21.

Mobile electronic device 20 furthermore comprises a telecommunication circuit 26 for communicating with a network 29. For example, in case mobile electronic device 20 is a cellular phone, telecommunication circuit 26 may be a telecommunication circuit communicating according to a GSM, GPRS, EDGE or UMTS telecommunication standard. In another embodiment, telecommunication circuit 26 may for example be a wireless LAN circuit, a Bluetooth communication circuit or a wire-based communication circuit.

In an embodiment, via network 29 which may be any suitable telecommunication network mobile electronic device 20 can access information, for example information of the internet, like webpages of the so-called world wide web (WWW). To display such webpages on display 23, a browser program 27 is provided in a memory 24 of mobile electronic device 20. When processor 22 executes browser program 27, a user can navigate through the world wide web, but may also navigate webpages or view pages encoded in a language parsible by browser 27 like HTML (hypertext mark-up language), JAVA or XML which pages may for example be stored in memory 27.

As already mentioned in the introductory portion, such webpages are often designed for being viewed on a computer having a comparatively large display, for example a 15 inch display, a 17 inch display or a 21 inch display, with a corresponding high resolution. In an embodiment, display 23 of mobile electronic device 20 is considerably smaller than that. For example, displays of mobile phones or personal digital assistants typically have a screen diagonal of about 2.5 to about 4 inches depending on the type of mobile phone or personal digital assistant and typically have resolutions of the order of 300×300 pixels, e.g. 240×320 pixels, although embodiments of the invention are not limited in this respect. Therefore, with many webpages only a comparatively small part of the webpage may be displayed at a given time in full size. In an embodiment, browser 27 additionally provides an overview mode where the complete webpage is displayed in miniaturized form on display 23, and then a user can chose which part of the webpage to view.

Nowadays, webpages often comprise dynamic content, i.e. parts of the webpage may change dynamically, for example in response to a user input or due to updates by a corresponding web server. In case a part of the webpage is changed or updated which is not currently displayed on display 23, in order to make the user aware of the change, an add-on 28 to browser 27 is provided which has the function of making the user aware of the change. Add-on 28 may for example be a so-called plug-in for browser 27. In another embodiment, no separate add-on 28 is provided, but the corresponding functions are directly integrated in browser 27, for example a user interface of browser 27. In still another embodiment, a user alerting function as will be described in more detail hereinafter is provided in a separate software program which is responsible for displaying webpages provided by a browser.

In the embodiment of FIG. 1, processor 22 together with browser 27 and add-on 28, i.e. programs, stored in memory 24 serve as a display control circuit for controlling display 23 and displaying webpages thereon. In other embodiments, such a display control circuit may be implemented in a different manner, for example by firmware.

Next, with reference to FIGS. 2, 3A and 3B, the operation of add-on 28 or a similar element as mentioned above will be discussed in detail.

Figure 2:
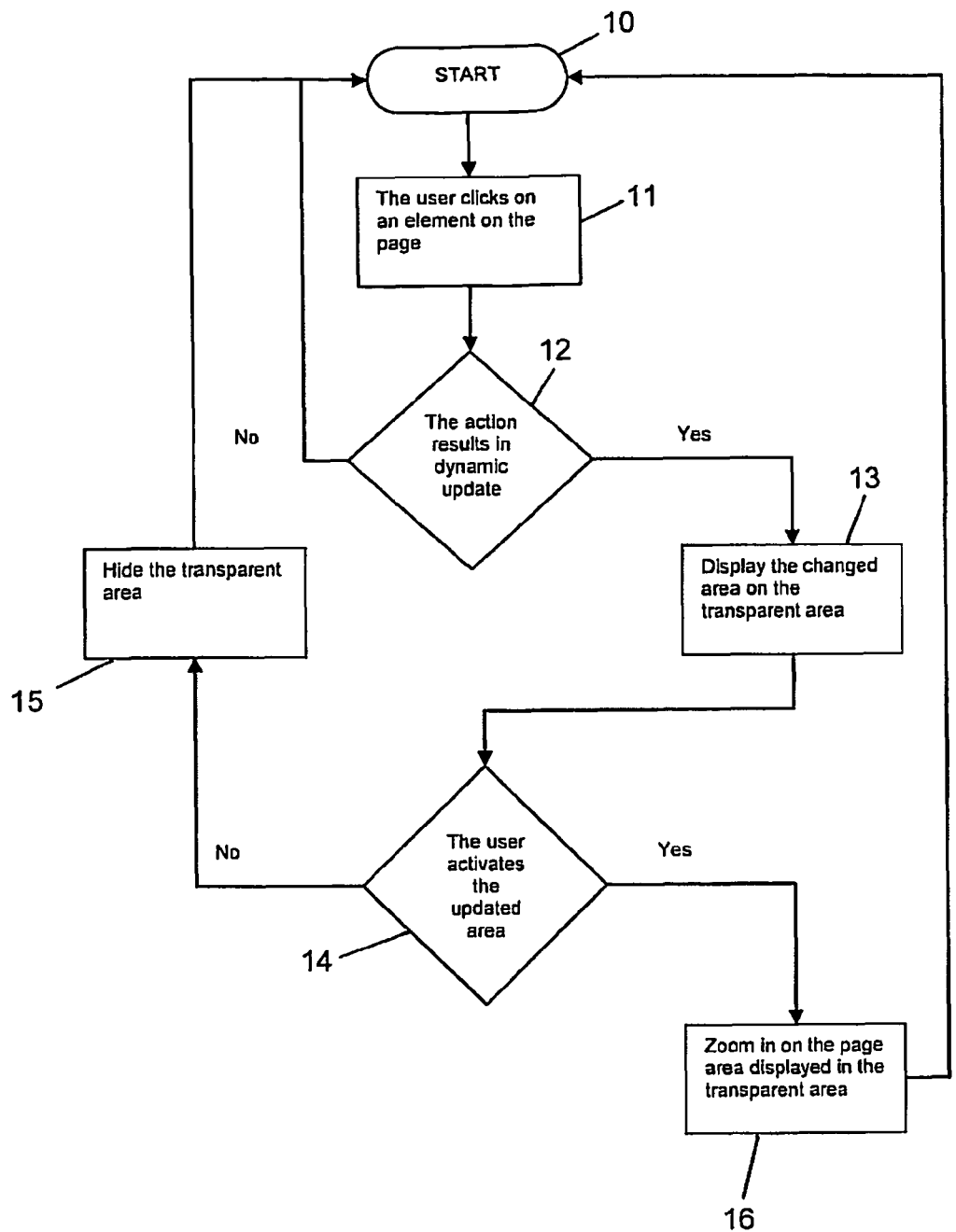
FIG. 2 is a flow diagram for illustrating a method according to an embodiment of the present invention.

In FIG. 2, a flow diagram illustrating a method which may be implemented for example via add-on 28, but which for example may also be implemented in browser 27 itself, is illustrated. In an embodiment, the method is executed in parallel to displaying of a webpage. The method is started at 10. At 11, an event is registered which may lead to a change of a part of the webpage. As an example, at 11 it may be registered that the user clicks on an element like a check box on the page, for example using a pointer controllable by a keypad, a joystick of a mobile electronic device or user input 21 of FIG. 1. Another event which may be registered is a user input via a keypad. A further event which may be registered is data received for example via telecommunication circuit 26 of the embodiment of FIG. 1 from a web server. It should be noted that in an embodiment all these kinds of events may be registered, while in other embodiments only some or one of these kinds of events is registered. In an embodiment, which event is registered or monitored may be user configurable.

If the method is implemented in the embodiment of FIG. 1, user input 21 and/or telecommunication circuit 26 may therefore serve as circuitry or elements for obtaining information leading to a change of the webpage.

At 12 it is checked whether the event registered at 11, for example an action performed by the user, results in a dynamic update, i.e. a change, of the webpage in an area which is not currently displayed. If this is not the case, i.e. either no change results or the change is within the area currently displayed, the method of the embodiment of FIG. 2 jumps back to 10. If the registered event results in a dynamic update outside the displayed portion of the webpage, at 13 the user is alerted to the update. For example, in an embodiment the changed area of the webpage is displayed on a transparent area, i.e. in a transparent manner, on the display. "Transparent" in this context indicates that the content displayed before the displaying of the changed area on the transparent area remains visible. For example, in an embodiment, an overview of the whole webpage may be displayed in a transparent manner where the location of the changed portion is indicated. In another embodiment, only the changed portion may be displayed. In still another embodiment, instead of displaying in a transparent manner, the display may be made without transparency. In some embodiments, the display of the changed area of portion may be performed for a predetermined period of time, for example for five seconds, although shorter or longer times are also possible. In yet another embodiment, the display may use a suitable color and/or animations to draw the user's attention to the area or portion of the webpage where the change took place. In yet another embodiment, additionally or alternatively an acoustic signal or message is given, for example via audio unit 25 of the embodiment of FIG. 2, to alert the user of the change.

At 14 it is checked whether the user indicates that he or she wishes to view the updated area, i.e. the area where the change has been performed, on the display. The user in an embodiment may for example do this by clicking on the portion where the changed area is displayed in a transparent or non-transparent manner at 13. In another embodiment, the user may for example press a specific key to activate the updated area. In still another embodiment a query may be presented to the user where he can expressly indicate whether he wants to view the updated area or not by choosing for example a yes-button or a no-button.

In case the user indicates that she or he wishes to see the updated area, at 16 a zoom is performed to the updated page area which previously for example was displayed in the transparent area or, in other words, the updated area is displayed on the display. In case the user does not activate the updated area, at 15 the transparent area is "hidden" again, i.e. the display reverts to the state before the changed area was displayed on the transparent area at 13. The hiding of the transparent area, as indicated above, may be performed after a predetermined time period has elapsed, or when the user expressly indicates, for example by clicking a corresponding button, that he or she does not wish to view the changed area.

In order to further illustrate the method of FIG. 2, an example for operations 11-13 of the embodiment of FIG. 2 will be illustrated with reference to FIGS. 3A and 3B. In FIG. 3A, a display 30 is illustrated on which a simple example for a part of a webpage is shown. In this part of the webpage, the user may as an example choose between a full list or a short list of some kind of items, wherein the choosing may be performed by clicking on a box before "full list" or "short list". In this example, the choice of the user leads to a full list or a short list being displayed on some other part of the webpage, i.e. some other part of the webpage which is currently not displayed changes to show the full list or the short list.

To alert the user of the update, as shown in FIG. 3B a transparent area (shown in grey in FIG. 3B) is displayed which in the illustrative example of FIG. 3B shows an overview of the whole webpage. In the example of FIG. 3B, the words "you are here" indicate the location of the part of the webpage currently shown on display 30 (i.e. the part shown in FIG. 3A), whereas the words "update here" indicate the location of the part where the update took place. In an embodiment, for example by clicking on the "update here" portion the updated portion will be displayed, while by clicking on any other part the transparent display is removed. As already indicated above, the way of alerting the user of the update shown in FIG. 3B is just one of many possibilities, and the other possibilities mentioned above may also be implemented. For example, as an animation, a colored, e.g. red, rectangle may be displayed which moves starting from the part of the webpage which is currently displayed to the part of the webpage which has been updated in an overview of the complete webpage displayed, either in a transparent or in an intransparent manner.

It should be noted that while in the above embodiments webpages retrieved from the internet were taken as an example, in other embodiments webpages from an internal or external storage like a memory or an hard disk drive may be displayed on a corresponding display, or pages or other graphical representations other than webpages may be displayed the content of which changes dynamically in areas not currently displayed.

Therefore, as obvious from the above explanations, many modifications and variations are possible without departing from the scope of the present invention, which is intended to be defined only by the appended claims and equivalents thereof.

What is claimed is:

1. A mobile electronic device, comprising:
   a display area; and a display control circuit configured to display a part of a page on said display area, identify a part of said page that exceeds the display area, detect a modification of said page, determine when said modification is in the part exceeding the display area, and when determined that said modification is in the part of said page exceeding the display area, then notifying a user of said mobile electronic device of said modification.

2. The mobile electronic device of claim 1, wherein said display control circuit comprises: a processor, and a memory, said memory comprising at least one program executable by said processor, said at least one program when executed causing said display control circuit to perform the identify, detect, and determine functions.

3. The mobile electronic device of claim 2,
   wherein said page comprises a webpage with dynamically changing content, and
   wherein said at least one program comprises a browser program.

4. The mobile electronic device of claim 1, further comprising a user input circuitry, wherein a user action is registered via said user input circuitry and it is determined whether said user action results in said modification of the part of said page.

5. The mobile electronic device of claim 1, further comprising displaying information in said display area indicative of said modification.

6. The mobile electronic device of claim 5, wherein said information comprises at least part of said modified part of said page.

7. The mobile electronic device of claim 5,
wherein said information comprises information displayed in a transparent manner overlying a currently displayed part of said page.

8. The mobile electronic device of claim 1,
wherein said notifying comprises at least one element of the group comprising reproducing an audio signal, displaying an animation on said display and displaying an overview of said page on said display.

9. The mobile electronic device of claim 1, wherein said display control circuit is further configured to receive an indication from the user indicative of whether the user requires to see the modified part of the page, and to display said modified part of the page in case the indication received from the user indicates that the user requires to see said modified part.

10. The mobile electronic device of claim 1,
wherein said mobile electronic device is selected from the group comprising a mobile phone, a personal digital assistant, a gaming equipment, a navigation system and a notebook.

11. A method, comprising: partially displaying a page in a display area of a mobile electronic device, identifying a part of said page exceeding the display area, detecting a modification of said page, determining when said modification is in the part exceeding the display area, and when determined that said modification is in the part of said page exceeding the display area, then notifying a user of said mobile electronic device of said modification.

12. The method of claim 11, wherein said notifying comprises displaying one element selected from the group comprising the part where said page is modified and an overview of said page highlighting said modification on said display.

13. The method of claim 12,
wherein said displaying of one element is performed in a transparent manner.

14. The method of claim 11, wherein said method further comprises receiving a user input causing said modification.

15. The method of claim 11, further comprises receiving said page from a network.

* * * * *

UNITED STATES PATENT AND TRADEMARK OFFICE
CERTIFICATE OF CORRECTION

| | | |
|---|---|---|
| PATENT NO. | : 8,140,056 B2 | |
| APPLICATION NO. | : 12/228215 | |
| DATED | : March 20, 2012 | |
| INVENTOR(S) | : Péter Blénessy et al. | |

It is certified that error appears in the above-identified patent and that said Letters Patent is hereby corrected as shown below:

On the Title page, item (75):

The first inventor's name "Peter Blénessy" should read:

--Péter Blénessy--.

The first inventor's city "Eslöve" should read:

--Eslöv--.

Signed and Sealed this
Tenth Day of July, 2012

David J. Kappos
*Director of the United States Patent and Trademark Office*